US005463802A

United States Patent [19]

Vachoux; André

[11] Patent Number: 5,463,802

[45] Date of Patent: Nov. 7, 1995

[54] DEVICE FOR REMOVING THE VALVES OF AN INTERNAL COMBUSTION ENGINE

[75] Inventor: André Vachoux, Collonge Sous Saleve, France

[73] Assignee: Serdi - Societe D'Etudes De Realisation Et De Diffusion Industrielles, Annecy, France

[21] Appl. No.: 177,518

[22] Filed: Jan. 4, 1994

[30] Foreign Application Priority Data

Jul. 29, 1993 [FR] France .................................. 93 09580

[51] Int. Cl.$^6$ .................................................. B23P 19/04

[52] U.S. Cl. ................................................................ 29/214

[58] Field of Search .......................... 29/213.1, 214–221, 29/888.42, 426.5, 464

[56] References Cited

U.S. PATENT DOCUMENTS

| | | | |
|---|---|---|---|
| 1,536,601 | 5/1925 | Anderson . | |
| 1,697,921 | 1/1929 | Krogman | 29/215 |
| 1,849,538 | 3/1932 | Bernitz, Jr. . | |
| 2,091,500 | 8/1937 | Clark . | |
| 3,315,339 | 4/1967 | Young . | |
| 3,316,623 | 5/1967 | Clark . | |
| 3,621,553 | 11/1971 | Lafeber . | |
| 4,022,453 | 5/1977 | Durgan | 29/217 |
| 4,912,825 | 4/1990 | Policella | 29/214 |
| 5,247,726 | 9/1993 | Harmand . | |

FOREIGN PATENT DOCUMENTS

| | | |
|---|---|---|
| 1524396 | 5/1968 | France . |
| 3135082 | 3/1983 | Germany . |
| 8527286 | 10/1985 | Germany . |
| 9111245 | 11/1991 | Germany . |
| 167691 | 11/1979 | Italy . |
| 2094215 | 9/1982 | United Kingdom . |
| 87/07198 | 12/1987 | WIPO . |

OTHER PUBLICATIONS

Govoni Brochure—Dati Technici.
K & L Cylinder Head Tools Brochure.

*Primary Examiner*—Robert C. Watson
*Attorney, Agent, or Firm*—Oliff & Berridge

[57] ABSTRACT

This device includes a cylinder head stand mounted so that it can pivot through at least 180° about a horizontal axis and capable of rigidly holding a cylinder head and a valve lifter. A plurality of blocks in the form of plates which are flexible and elastic and each of which has, on the one hand, a central hole of non-circular transverse section allowing it to be engaged, with rotational connection, on a horizontal support rod and, on the other hand, a perimeter allowing part of its edge face to be applied against at least one valve head.

16 Claims, 4 Drawing Sheets

DEVICE FOR REMOVING THE VALVES OF AN INTERNAL COMBUSTION ENGINE

BACKGROUND OF THE INVENTION

The present invention relates to a device for removing the valves of an internal combustion engine.

It is known that for grinding the valves of an internal combustion engine, and their seats, it is necessary to withdraw each valve from the cylinder head to make both its conical bearing surface and its seat, which is secured to the cylinder head, accessible.

Now, for removing a valve, it is necessary to push down the spring cup which acts as a stop for its spring for returning to the closed position, and which is engaged on its stem, so as to be able to withdraw the two collets which act as a stop for this spring cup by wedging between the latter and the stem of the valve.

Naturally, for it to be possible to carry out this operation under good conditions it is preferable for the cylinder head to be arranged upside-down, that is to say so that the valve heads are pointing downwards and their stems are pointing upwards.

It is easily understood that after the collets which retain them have been withdrawn, the valves tend to fall freely onto the workbench, which risks damaging them.

DESCRIPTION OF THE PRIOR ART

To prevent this drop, it is possible to retain them manually, provided that their heads are accessible and that a second operator is present, because the first operator needs both his hands for removing the collets.

It is also known to use clamps but, given that one per valve is required, fitting them considerably increases the time required for the operation.

It is also known to use a sort of inflatable air bag which, in the inflated state, fills the chambers and thus retains the valves. The major drawback of this solution lies in the relative fragility of the membrane of the air bag which quickly becomes damaged upon contact with the edges of the chambers of the cylinder head.

Regardless of the means used for retaining the valves, it is advantageous to use a planar cylinder head stand of a known type, mounted so that it can pivot through at least 180° about a horizontal axis and which can be locked in any desired angular position whatsoever to present, pointing upwards, either the top of the cylinder head and the valve stems, or the underside of the cylinder head and consequently its chambers and the valve heads.

Finally, it is also known to use, for pushing down the thrust spring cups of the return springs of the valves, and consequently for compressing these springs, valve lifters consisting of a lever with two arms articulated on one another, the first of which is articulated about a horizontal spindle located at a level above that of the face of the cylinder head which can be accessed from above, and the second arm of which, being articulated at an intermediate point on the first, has an annular free end capable of being applied and pressed against the thrust washer of the return spring of the valve to be removed, the first arm of this valve lifter, which can be moved transversely along the horizontal spindle on which it is articulated, having a free end, possibly equipped with an extension piece, intended to be actuated by an operator.

SUMMARY OF THE INVENTION

The present invention aims to overcome the aforementioned drawbacks by providing a device including a cylinder head stand of the type indicated above and a valve lifter also of the type indicated above but furthermore including means for retaining the valves which are simple, reliable, and can be retracted easily.

For this purpose, these means are comprised of blocks in the form of a plate, having for example a thickness of the order of 2 cm, made from a relatively resilient, elastic and impact-resistant material, each of which exhibits, on the one hand, a central hole of non-circular transverse section allowing it to be engaged with rotational connection on a horizontal support rod of the same transverse section and, on the other hand, a perimeter allowing it to be placed in contact with at least one valve head, regardless of the shape and depth of the cylinder head chamber in which this valve head is housed.

The resilience of the constituent material of these blocks prevents any risk of the chambers being damaged or impaired, their elasticity allowing them to resume their original form after each deformation and their impact resistance allowing them to withstand, without being impaired, the impacts which it is possibly necessary to apply to the valve stems or to the thrust washers of their return springs for detaching them from their position.

A material which is perfectly suitable for making these blocks is a rubber with a Shore hardness of 80.

Naturally, each block can be moved transversely along its support rod to be placed facing one or two valve heads.

Advantageously, the transverse sections of the central hole of each block and of their support rod are polygonal and, preferably, square.

In all cases, the central hole of each block is advantageously clad with a metallic bearing.

According to a beneficial embodiment of the invention, the perimeter of each block is substantially rectangular and exhibits two planar and parallel long lateral faces, a short end face which is also planar, perpendicular to the other two but having a central rib extending over the entire thickness of the block and of rectangular transverse section, whereas its short face at the opposite end has a substantially semi-circular profile divided into two equal sectors by a substantially semi-cylindrical notch.

Thus, if the end of the chamber is flat, one of the two planar lateral faces of the block may be applied against a valve head. If the end of the chamber is narrow, deep, and occupied by just one valve arranged radially, it is the free edge of the rib of one of the block end faces which will be applied against the head of this valve. Finally, if two V-configured valves occupy the end of the chamber, it is one of the rounded sectors of the other end-face of the block which will be applied against one of the heads of these valves, the cylindrical notch separating these sectors straddling the gap which separates these two valve heads.

According to another feature of the invention, making it possible correctly to position each block for retaining the valves, before they are removed, their support rod is connected to the cylinder head stand so that the distance separating this rod from the cylinder head stand can be set to the desired value.

According to a simple embodiment of the invention, the cylinder head stand is comprised of a rectangular frame, each short side of which carries, at its center, a horizontal journal supported by a vertical underframe and each long side of which supports at least one bracket for mounting a cylinder head, each short side of this frame furthermore supporting the horizontal articulation spindle of an arm supporting one of the ends of a bar forming the articulation spindle of at least one valve lifter, each arm having a longitudinal slot along which the corresponding end of this bar can be moved and fixed.

The means for connection between the support rod of the blocks retaining the valves and the cylinder head stand frame are comprised, for example, of bolts, one end of which is secured to the frame and the other end of which is intended to be engaged in an emerging slot with which each end of this rod is provided.

BRIEF DESCRIPTION OF THE DRAWINGS

In any case, the invention will be clearly understood with the aid of the description which follows, with reference to the appended diagrammatic drawings which represent, by way of non-limiting example, one embodiment of this device.

DESCRIPTION OF THE PREFERRED EMBODIMENT

Figure 1:
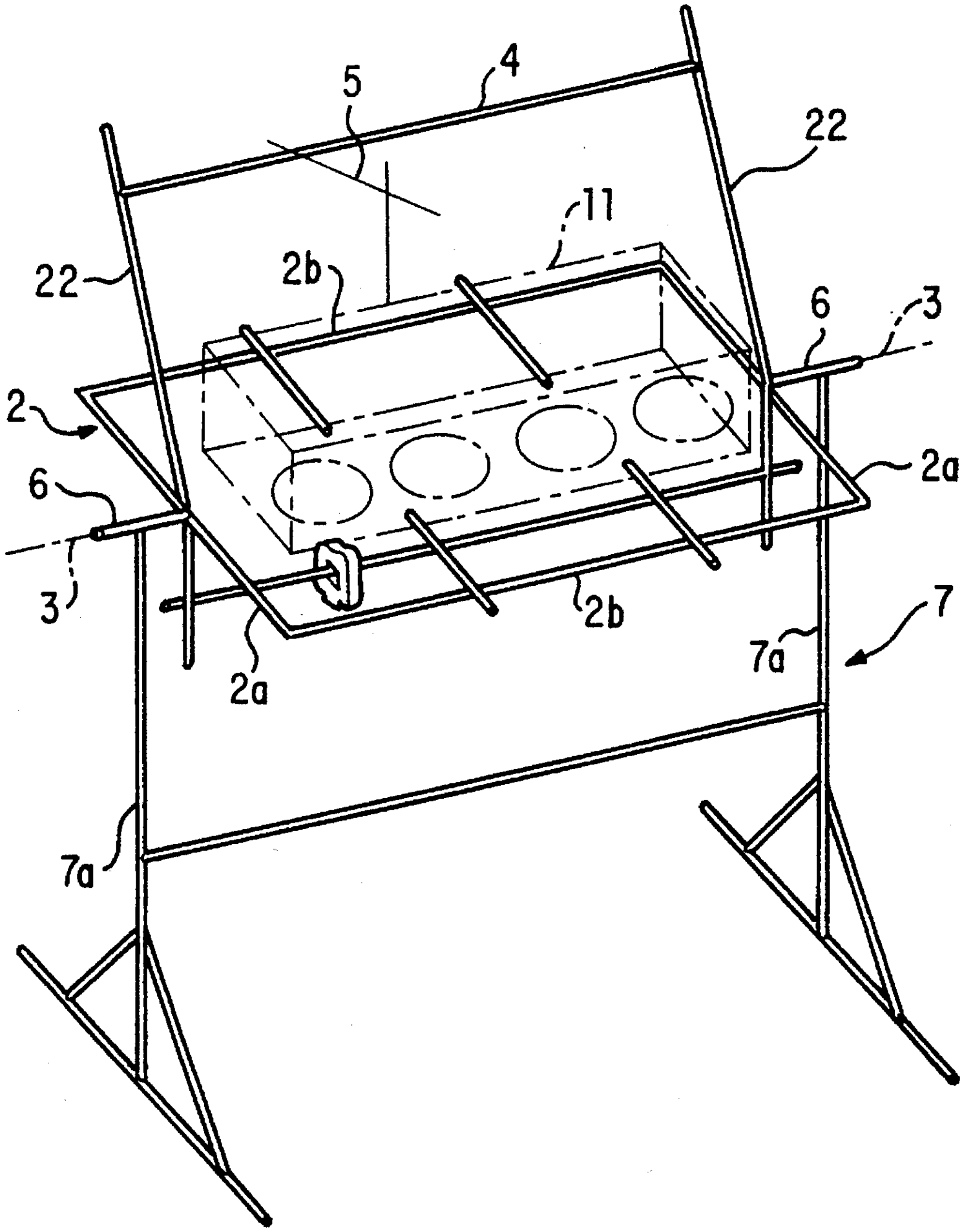
FIG. 1 is a very simplified perspective view.
Figure 2:
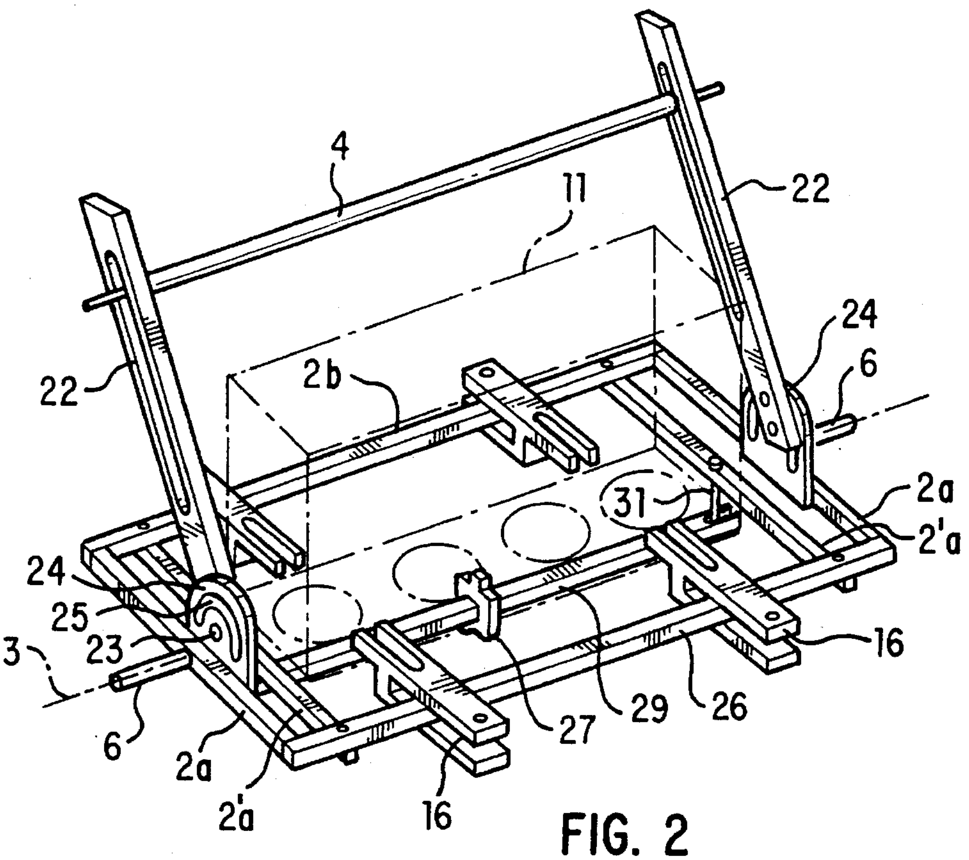
FIG. 2 is a perspective view, similar to FIG. 1, on a larger scale with the support underframe of the frame removed.

As shown in FIGS. 1 and 2, the device of the invention is of the type comprising, on the one hand, a cylinder head stand 2 carried by a vertical underframe 7 so that it can pivot about a horizontal axis 3, a horizontal bar 4 intended to receive at least one valve lifter 5 articulated on it, and set out so that it can be positioned at an adjustable distance from one of the faces of the cylinder head stand 2.

As shown in the drawing, the cylinder head stand 2 is comprised of a rectangular frame, each short side 2*a* of which carries, at its center, a journal 6 which is concentric with the articulation axis 3 of the frame 2. Each journal 6 may be supported by a bearing, which is not visible in the drawing, formed at the upper end of one of the two vertical posts 7*a* of an underframe 7.

The device of the invention is intended, as indicated beforehand, to facilitate the removal of the valves from a cylinder head, that is to say to allow the valves to be withdrawn from the cylinder head under good conditions.

Figure 3:
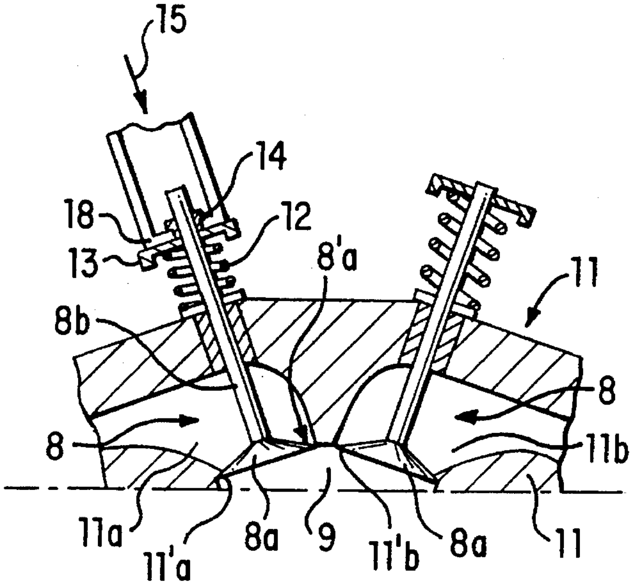
FIG. 3 is a partial transverse section of a cylinder head, in line with a chamber provided with two V-configured valves.

FIG. 3 is a partial view which illustrates the mounting of two V-configured valves 8, the heads 8*a* of which are intended to close or open the intake orifice 11*a* and exhaust orifice 11*b* respectively of a chamber 9 formed in a cylinder head 11.

For this purpose, each valve head 8*a* has a conical bearing surface 8'*a* and each exhaust orifice 11*a* and intake orifice 11*b* has a conical seat, 11'*a*, 11'*b* respectively, intended to serve as a support for the conical bearing surface 8'*a* of the corresponding valve 8 for the purpose of ensuring the leaktight closure of the corresponding orifice 11*a* or 11*b* when this valve is in the closed position.

A return spring 12 which surrounds the free outer end of the stem 8*b* with which each valve 8 is provided normally keeps the valves 8 in the closed position, which spring is kept in the compressed state against the external face of the cylinder head 11 by bearing against a washer 13 which acts as a stop for it and which is itself retained in the axial position corresponding to the valve 8 being closed by two crescent-shaped wedge collets 14 which are normally wedged between the stem 8*b* of the valve 8 and the inner edge of the said washer 13.

To remove a valve 8, it is sufficient, as shown in FIG. 3, to exert on the washer 13 a force oriented in the direction of the arrow 15, that is to say along the axis of the stem 8*b* of the valve 8 being removed, in order thus to compress its return spring 12 and release its collets 14 which can then easily be withdrawn. After the collets 14 have been withdrawn, the valve 8 is free to be extracted from the cylinder head 11 from the inside of the chamber 9.

Naturally, the operation necessary for withdrawing the collets 14 is easier to carry out when the cylinder head is held right side up, that is to say as illustrated in FIG. 3. For this purpose it is fixed to the frame 2 beforehand with the aid of mounting brackets 16 with which the two long sides 2*b* of the frame 2 are equipped.

Figure 4:
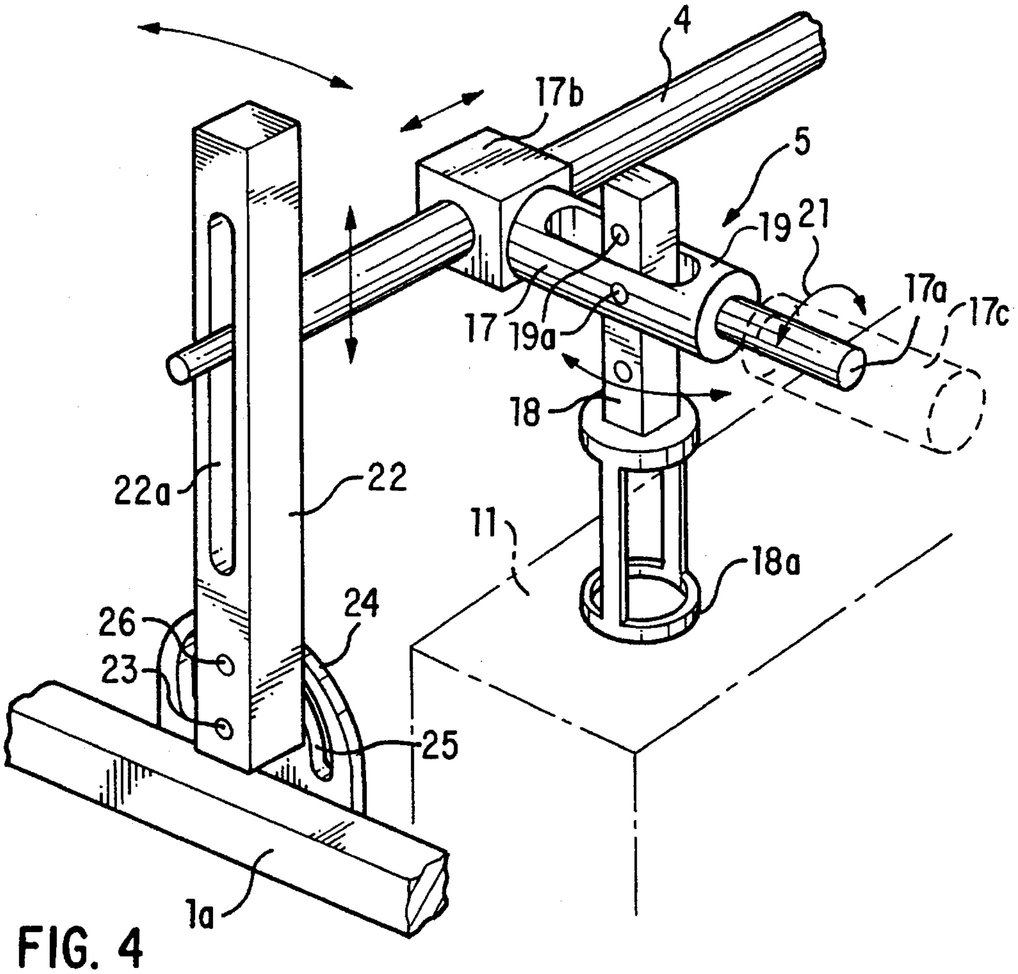
FIG. 4 is a perspective view on a larger scale showing a valve lifter according to the invention.

The valve lifter 5 is comprised, as shown in FIG. 4, of two arms articulated to one another, namely a first arm 17 articulated by one of its ends to the horizontal bar 4 and a second arm 18 articulated to a spindle 19 carried by the first arm 17, at an intermediate point, so as to form, on this first arm 17, a free end 17*a* which is not only located distinctly beyond the articulation spindle 19 for the second arm 18, but also capable of receiving an extension piece 17*c*. The free end 17*a* and extension piece 17*c*, if equipped, are actuated by an operator.

As shown in FIG. 4, the first arm 17 is articulated on its end 17*b*, mounted so that it can slide along the bar 4, so that it can pivot about its longitudinal axis, as illustrated by the arrow 21.

As shown, still in FIG. 4, the end of the second arm 18 via which the latter is articulated to the first arm 17 has a series of through holes 19*a* in a chosen one of which the articulation spindle 19 carried by the first arm 17 may be engaged.

Finally, as is visible in FIG. 4, the free end of the second arm 18 is shaped into a ring 18*a* the dimensions of which correspond to those of the washer 13 on which there bears the spring 12 for returning each valve 8 to the closed position.

Not only do the multiple and adjustable articulations of this valve lifter 5 allow it to be matched to its conditions of use on each valve of a cylinder head, but furthermore, its articulation bar 4 is itself supported at each of its ends by an arm 22 mounted so that it can pivot about a horizontal spindle 23 secured to the frame 2, and more precisely secured to one of the short sides 2*a* of this frame.

To allow the distance of this bar 4 with respect to the upper face of the cylinder head 11 on which the thrust washers 13 of the springs 12 are accessible to be set to the desired value, each arm 22 has a longitudinal slot 22*a* along which the corresponding end of the bar 4 can move with the possibility of locking in the desired position.

Furthermore, to limit the pivoting of each arm 22 to an angle of approximately 180°, a tab 24 provided with a circular arc-shaped slot 25 in which a stud 26 secured to the arm 22 in question is engaged, is provided secured to each short side 2*a* of the frame 2.

According to the invention, to prevent the valves 8 from falling freely after they have been released by the withdrawal of their collets 14, means are provided for retaining all the valves 8 of one and the same cylinder head.

Figure 5:
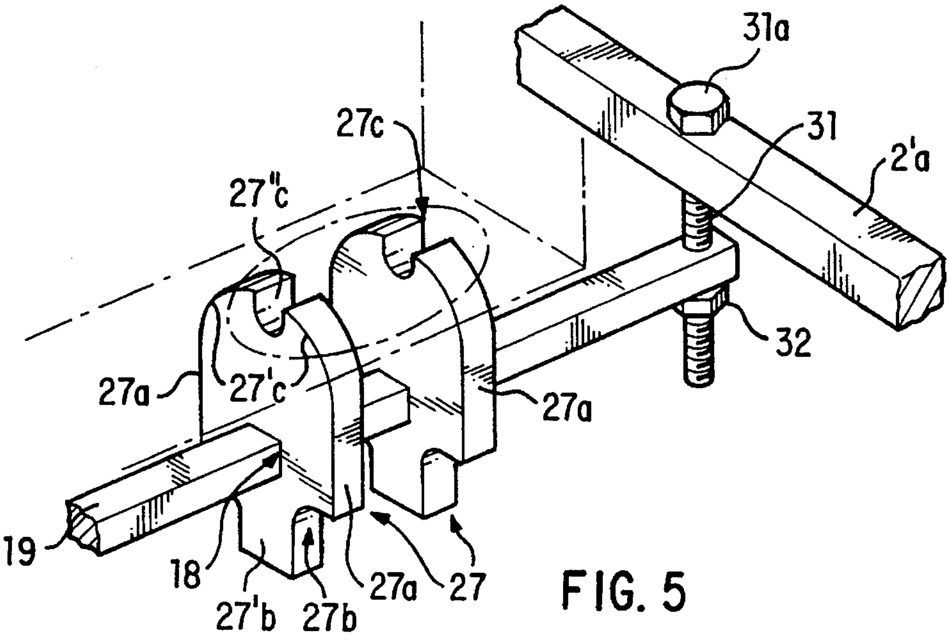
FIG. 5 is a partial view on a larger scale showing the layout of the blocks for retaining the valves and of their support rods.
Figure 6:
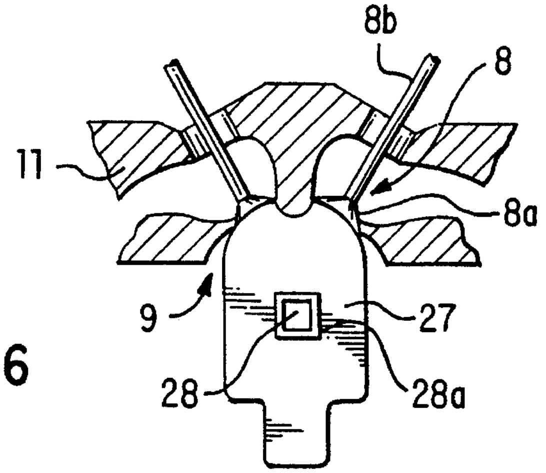
FIGS. 6 to 8 are simplified views in transverse section, similar to FIG. 3, showing three ways of using the blocks for retaining the valves depending on the shape of the chamber in the cylinder head and on the arrangement of the valves with which this chamber is provided.
Figure 7:
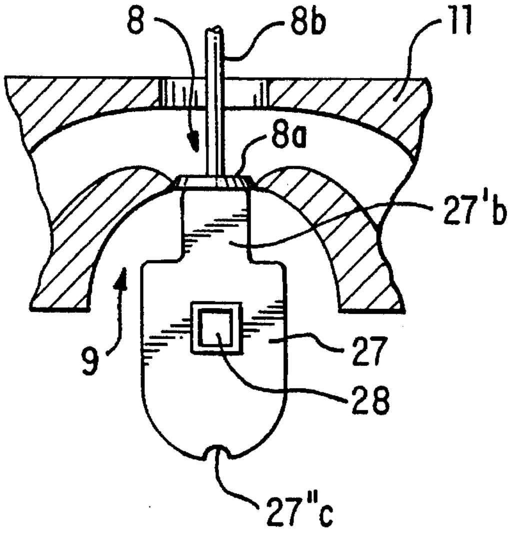
Figure 8:
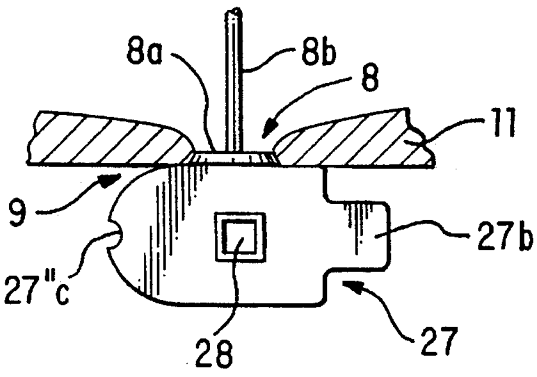

These means are partially represented in FIG. 5, and their method of use is illustrated in FIGS. 6 to 8.

As shown in FIG. 5, these means may comprise as many retaining blocks 27 as the cylinder head 11 to be treated includes valves 8. These retaining blocks 27 have a substantially rectangular perimeter and exhibit a thickness of the order of 2 cm. They are made from a relatively resilient and elastic material capable of withstanding impacts without being impaired. For example, these blocks 27 may be made from a rubber with a Shore hardness of 80.

Each block 27 exhibits, at its center, a through hole 28 of square transverse section allowing it to be engaged with rotational connection on a support rod 29 of the same transverse section. In the embodiment represented, this hole is formed in a metallic bearing 28*a* in each block. The support rod 29 for the blocks 27 for retaining the heads 8*a* of the valves 8 is suspended from auxiliary crosspieces 2'*a* of the frame 2 through the use of a bolt 31 the head 31*a* of which rests on said auxiliary crosspiece 2'*a* and the nut 32 of which supports the rod 29.

As shown more particularly in FIG. 5, the perimeter of each block 27 for retaining a head of a valve 8 exhibits two planar and parallel long lateral faces 27*a*, an end face 27*b* perpendicular to the previous two and exhibiting, at its center, a rib 27'*b* of substantially rectangular profile. The other end face 27*c* exhibits a substantially semicircular profile divided into two sectors 27'*c* each of which forms approximately a quarter of a circle and is separated from the other by a notch or groove 27"*c* of substantially semicylindrical profile.

Each block 27 is intended to be applied under slight pressure against at least one head 8*a* of a valve 8 in the closed position before this valve is removed, that is to say before its collets 14 are withdrawn.

To do that, it is sufficient to position each block 27 facing at least one valve 8 and, possibly, facing two valves if these are V-configured in the cylinder head 11 in question. The application of each block 27 against at least one head 8*a* of a valve 8 is obtained by securing the nut 32 of each bolt 31 supporting the rod 29 which itself supports the blocks 27.

It is easily understood that this installation is easier to carry out when the cylinder head 11 is arranged upside down, that is to say with the heads 8*a* of these valves 8 pointing upwards and their stem 8*b* pointing downwards, because they are thus all visible to the operator tasked with removing the valves 8. The operator can therefore easily position each block 27 so that it is in its correct position before applying them against the valves 8 by tightening the nuts 32 of the bolts 31.

Once the blocks 27 have been applied against the heads 8*a* of the valves 8, the cylinder head can be returned to its original position, as illustrated in FIGS. 3 and 6 to 8, so that one and the same operator can remove the valves 8, that is to say withdraw their retaining collets 14. After this removal, it is easily understood that the valves 8 remain in place by virtue of the blocks 27 being applied against their heads 8*a*.

FIG. 6 shows the use of the valve retaining device illustrated in FIG. 5 in the event where the chamber 9 in question includes two V-configured valves 8. In this case, each quarter circle sector 27'*c* of a block 27 is applied against one of the two corresponding valves 8, whilst the notch 27'*c* straddles the part of the wall of the chamber 9 separating the two heads 8*a* of the valves 8.

The method of use illustrated in FIG. 7 corresponds to a relatively deep and narrow chamber 9 the end of which includes just one valve 8 arranged perpendicularly to the plane of its opening. In this case, it is the rib 27'*b* which is applied against the head 8*a* of this valve 8.

FIG. 8 illustrates the method of use of the valve retaining device of FIG. 5 in the case where the chamber 11 has a flat end including just one valve 8. In this case, as shown in this figure, it is one of the long lateral faces 27*a* of the block 27 which is applied against the head 8*a* of this valve 8.

In all cases, the resilience of the constituent material of the blocks 27 prevents any risk of the chamber 9 and the heads 8*a* of the valves 8 being damaged. Furthermore, the elasticity of this material allows the blocks 27 to return to their original form after they have been deformed by being applied under pressure into the end of the chambers 9.

Finally, as shown more particularly in FIGS. 5 to 8, each through hole 28 of a block 27 intended to be engaged and slid on the rod 29 supporting the blocks 27, is clad with a metallic bearing 28*a*.

As indicated previously, the installation of the blocks 27 takes place while the cylinder head 11 is presented upside down to the operator, that is to say whilst, with respect to the position which it occupies in FIG. 2, the frame 2 is pivoted through 180° after the cylinder head 11 has been mounted on it.

After the blocks 27 have been installed, the frame 2 is again pivoted through 180°, that is to say until it is in its position illustrated in FIG. 2, so that the cylinder head 11 is again positioned the right way up and the thrust washers 13 of the springs 12 for returning the valves 8 to the closed position are easily accessible by a valve lifter 5 articulated on the bar 4.

I claim:

1. A device for removing valves of an internal combustion engine, comprising:

a planar cylinder head stand mounted so that it can pivot through at least 180° about a horizontal axis, capable of rigidly holding a cylinder head;

at least one valve lifter operably connected to said cylinder head stand and located and configured to be pressed against a thrust washer of a return spring of a valve of a cylinder head mounted on said cylinder head stand;

a support rod operably connected to said cylinder head stand on an opposite side of said cylinder head stand from said valve lifter; and at least one block located to retain said valve while said valve lifter is pressed against said thrust washer, said block being mounted on said support rod and being made of a resilient, elastic and impact resistant material.

2. The device as claimed in claim 1, comprising a plurality of said blocks.

3. The device as claimed in claim 1, wherein each said block comprises a hole of non-circular cross section, said support rod has a cross section that is substantially the same as said non-circular cross section, and each said block is mounted on said support rod by said rod passing through said hole.

4. The device as claimed in claim 1, wherein each said block is in the form of a plate, with a perimeter of said plate being of variable shape to allow a part of said perimeter to be applied against a head of said valve regardless of a shape and depth of a chamber of a cylinder head in which said valve is housed.

5. The device as claimed in claim 4, wherein each said block has a thickness of about 2 cm.

6. The device as claimed in claim 1, wherein said material is rubber.

7. The device as claimed in claim 1, wherein each said block is made from a rubber with a Shore hardness of approximately 80.

8. The device as claimed in claim 3 wherein said hole of each block is equipped with a metallic bearing.

9. The device as claimed in claim 1, wherein a perimeter of each block is substantially rectangular and exhibits two planar and parallel long lateral faces, a short end face which is also planar, perpendicular to the other two and having a central rib extending over an entire thickness of the block and of rectangular transverse section, and a short face at the opposite end of said block that exhibits a substantially semicircular profile divided into two equal sectors by a substantially semicylindrical notch.

10. The device as claimed in claims 1 wherein the rod supporting the blocks is connected to the cylinder head stand so that a distance separating it from the cylinder head stand can be adjusted to a desired value.

11. The device as claimed in claim 1, wherein the cylinder head stand comprises a rectangular frame having two short sides and two long sides, each short side carries, at its center, a horizontal journal supported by a vertical underframe and each long side supports at least one bracket for mounting a cylinder head, each short side supporting a horizontal articulation spindle of an arm supporting a bar forming an articulation spindle of said at least one valve lifter, each said arm having a longitudinal slot along which a corresponding end of said bar can be moved and fixed.

12. The device as claimed claim 1, wherein the support rod is connected to said cylinder head stand by bolts having one end secured to a crosspiece of the stand, and another end engageable in an emerging slot in each end of the support rod.

13. The device as claimed in claim 1, wherein the valve lifter is comprised of a lever with two arms articulated on one another, a first said arm being articulated on a horizontal spindle and a second said arm being articulated at an intermediate point on the first arm, and having an annular free end capable of being applied and pressed against said thrust washer, the first arm of this valve lifter being movable transversely along said horizontal spindle, having a free end for actuation by an operator.

14. The device as claimed in claim 13, wherein said free end is equipped with an extension piece.

15. A device for removing valves of an internal combustion engine, comprising:

a planar cylinder head stand mounted so that it can pivot through at least 180° about a horizontal axis, capable of rigidly holding a cylinder head;

at least one valve lifter operably connected to said cylinder head stand and located and configured to be pressed against a thrust washer of a return spring of a valve of a cylinder head mounted on said cylinder head stand;

a support rod operably connected to said cylinder head stand on an opposite side of said cylinder head stand from said valve lifter; and block means for resiliently, elastically and impact resistantly retaining said valve while said valve lifter is pressed against said thrust washer, said block means being mounted on said support rod.

16. The device as claimed in claim 1, wherein said at least one block contacts said valve while said valve lifter is pressed against said thrust washer.

* * * * *